Patented May 18, 1954

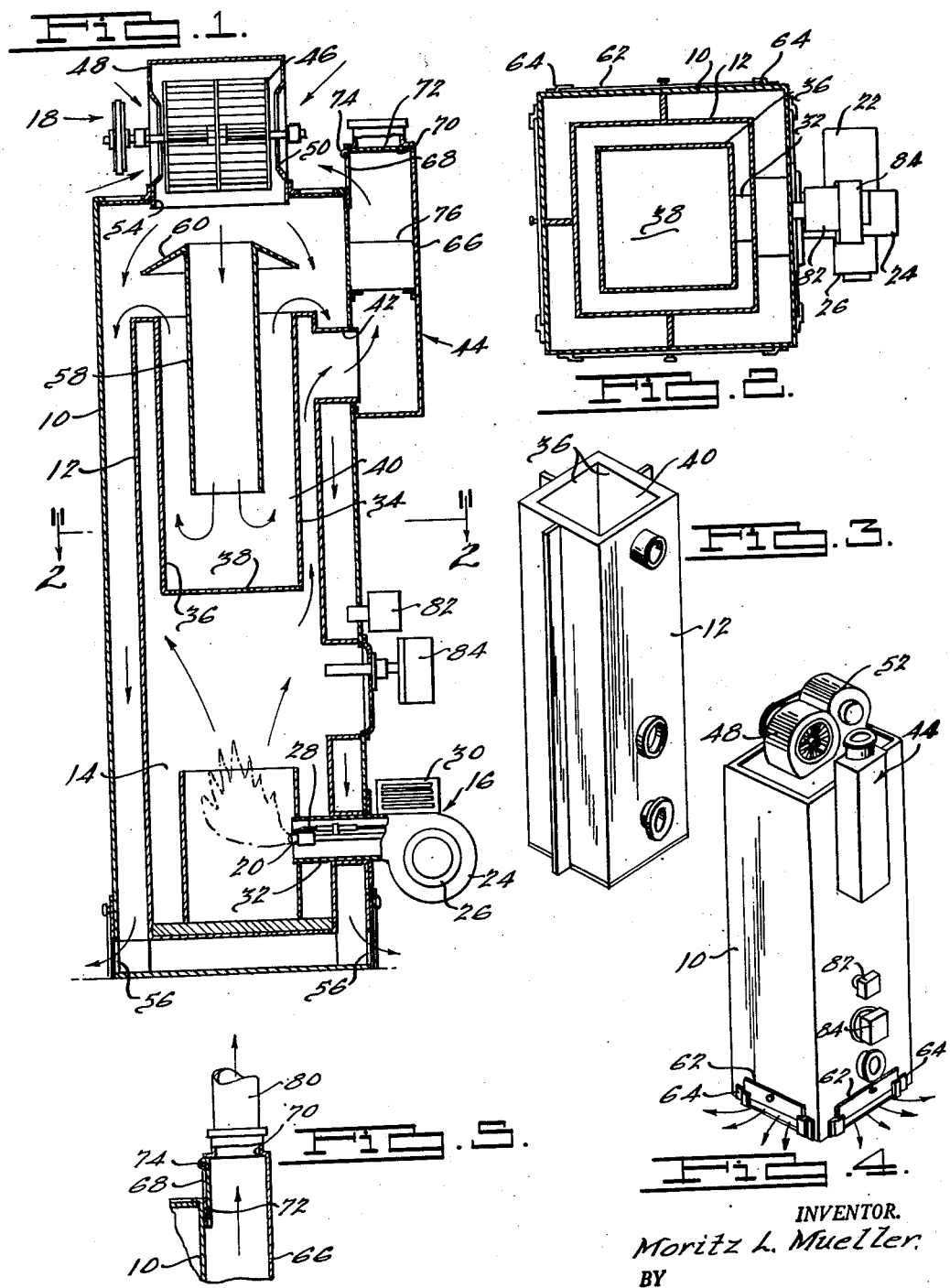

2,678,811

UNITED STATES PATENT OFFICE 2,678,811

HEATING APPARATUS

Moritz L. Mueller, Silver Spring, Md., assignor, by mesne assignments, to himself and Cecelia H. Mueller, Silver Spring, Md., as joint tenants with right of survivorship Application February 26, 1951, Serial No. 212,710

4 Claims. (Cl. 263—19)

This invention relates to heating apparatus in general and has particular reference to an oil burning furnace for delivering heated air to a partially enclosed or limited space for heating the same in order that human beings may occupy and work in such space.

Heating apparatus embodying my invention is characterized by the 100% recovery and utilization of heat units from the fuel burned and by the portable nature of the apparatus permitting its use without employing chimneys or vents for the products of combustion and without ducts for distributing the heated air throughout the space to be heated.

The heating apparatus of this invention is particularly suitable for use in heating a partially enclosed space, a portion of a relatively large building, such as a hangar, garage, factory or the like, or an outside area, to a temperature suitable for human activity. The furnace is arranged to discharge heated streams of air outwardly and/or downwardly from its lower end into the space surrounding or adjacent the furnace. The unit may be mounted upon a wheeled truck or platform so that it can be moved around to different locations, or it may be suspended so as to deliver heated air downwardly into the space to be heated.

To increase the efficiency of the furnace the present invention contemplates and provides a means for utilizing all of the heat from the products of combustion generated by the fuel burning means. The furnace is of the type wherein the fuel is burned in a combustion chamber or heat exchanger and air is drawn into the furnace and passed over the heat exchanger and discharged into the space to be heated. In order to utilize all of the available heat from the products of combustion, the products of combustion are discharged from the heat exchanger into and mixed with the air to be heated and circulated with the air to be heated so as to increase the temperature thereof above that normally obtained with a furnace having a heat exchanger and fuel burning means of similar capacity. Furnaces and heating equipment now in use utilize only approximately 75% of the potential available heat from the fuel used, the remainder being discharged into the atmosphere through a chimney or flue. Thus, approximately 25% of the heat generated is wasted heat and is not utilized in heating the space to be heated. This invention eliminates such wasted heat and consequently results in a substantial saving in the fuel used to achieve the same heat output as conventional furnaces, or by using the same amount of fuel a substantial increase in the heat output can be obtained.

The products of combustion of fuel oil are composed of carbon dioxide, water, nitrogen, and in some instances traces of sulphur dioxide if the fuel oil burned contains any sulphur. If combustion is properly carried out, no carbon monoxide will be formed, and with my invention large amounts of air considerably in excess of that required for complete combustion may be employed without any sacrifice in the efficiency of the apparatus. The small quantities of sulphur dioxide, if any, present in the flue gases will not have any harmful effect when the flue gases are discharged into a large or well ventilated space. However, in the furnace herein disclosed a suitable filter means is provided for removing such sulphur dioxide and other objectionable elements if any contained in the flue gases before they are mixed with the stream of air to be heated and discharged into the space to be heated, although such filter means may not always be used, depending on the nature of fuel oil employed, the place where the furnace is used, and the desires of the people using the space heated by the furnace.

It is therefore a principal object of the invention to provide a new and improved and more efficient furnace for supplying heated air to a space in a building.

A further object is to provide a furnace of the type described adapted to utilize 100% of the potential available heat of the fuel used in heating air to be supplied to the space to be heated.

Another object of the invention is to provide a furnace in which the hot products of combustion are mixed with air to be heated and circulated therewith through the furnace and discharged into the space to be heated.

A further object of the invention is to provide a new and improved furnace particularly adapted to heat a relatively small space in a relatively large unheated building.

Another object of the invention is to provide heating apparatus comprising a compact and self-contained unit characterized by the absence of air ducts and flues.

A still further object of the invention is to provide a new and improved heat exchanger for a furnace of the type described.

Another object is to provide a furnace in which the flue gases are circulated through the furnace with air to be heated, and in which filtering means are provided for removing objectionable impurities from such flue gases.

Other and further objects of the invention will be apparent from the following description and claims and may be understood by reference to the accompanying drawings, of which there is one sheet, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a vertical sectional view through a furnace embodying the present invention;

Fig. 2 is a sectional view taken along lines 2—2 of Fig. 1;

Fig. 3 is a perspective view of the heat exchanger employed in the furnace shown in Fig. 1;

Fig. 4 is a perspective view of the furnace; and

Fig. 5 is a fragmentary sectional view showing an alternative arrangement of the furnace of Fig. 1.

Referring more particularly to the drawings, a furnace constructed according to the present invention comprises an outer casing 10 having a heat exchanger 12 therein formed to provide a combustion chamber 14 at the lower end thereof, an oil burner indicated generally at 16 for generating heated products of combustion and supplying the same to the heat exchanger, air circulating means indicated at 18 for drawing air to be heated into the furnace and discharging the same downwardly over the heat exchanger 12 in heat exchange relation therewith and into the space to be heated.

The casing 10 is made of sheet metal and may be suitably insulated. The heat exchanger 12 comprises a vertically extending sheet metal drum arranged within the casing 10 and spaced from the top and side walls thereof. The oil burner 16 is of the pressure atomizing type and in general comprises a nozzle 20 supplied with oil from an oil pump 22, a fan 24 driven by an electric motor 26 for supplying combustion air, and ignition means including electrodes 28 and a transformer 30. The heat exchanger 12 is closed at its lower end and at such lower end defines the combustion chamber 14 in which the atomized oil and air supplied by the burner 16 are burned. The burner 16 is mounted on the casing 10 and the air tube 32 thereof extends through the casing into the combustion chamber 14. The capacity of the fan 24 preferably is such as to supply air to the combustion chamber 14 greatly in excess of that required for combustion so as to eliminate any possibility of carbon monoxide in the products of combustion.

The heat exchanger 12 is provided at its upper end with a re-entrant portion 34 formed by vertically extending walls 36 thereof which are spaced inwardly from and substantially parallel to the outer walls of the heat exchanger 12 and joined at their upper ends to the upper ends of the outer walls of the heat exchanger. A bottom wall 38 connects side walls 36 so as to define an open topped heat exchange chamber 40. An outlet 42 for heated products of combustion is provided at the upper end of the heat exchanger 21. The outlet 42 communicates with a filter box 44, the purpose of which will be more fully explained hereinafter.

The products of combustion generated by the oil burner 16 pass upwardly through the heat exchanger and through the outlet 42. The air circulating means 18 comprises a blower 46 arranged within a casing 48 having axial air inlets 50 at either side thereof. The blower 46 is mounted on the upper wall of the casing 10 and is driven by an electric motor 52, also mounted on the casing 10 or on the blower housing 48. The blower housing 48 has an outlet 54 therefrom communicating with the interior of the casing 10 directly above the heat exchanger 12. Air to be heated is drawn into the blower through the air inlets 50 and discharged through the outlet 54 into the interior of the casing and downwardly over the heat exchanger 12 through the space between the heat exchanger and the casing 10, and is discharged through outlets 56 at the lower end of the casing 10. The air discharged by the blower 18 passes through the furnace in counterflow heat exchange relation with the heated products of combustion flowing through the heat exchanger 12.

The portion 34 of the heat exchanger 12 provides additional heat exchange surfaces over which air to be heated is passed. A suitable baffle 58 is arranged below the outlet 54 from the blower 18 and depends into the chamber 40 so as to direct air from the blower downwardly into the chamber and then upwardly along the side walls 36 and then downwardly over the outer walls of the heat exchanger 12. The baffle 58 at its upper end is provided with a flange portion 60 so that part of the air discharged by the blower 18 is directed into the spaces between the heat exchanger 12 and the casing 10 while the remainder of such air to be heated is directed into the heat exchanger chamber 40.

The furnace is arranged to stand on the floor of the building in which it is to be used, or if desired it may be mounted on a wheeled truck or platform (not shown) so as to be easily moved to whatever location it is desired to heat. When the furnace is arranged on the floor the outlets 56 at the lower end of the casing are arranged to direct streams of heated air laterally over the floor of the building, and such heated air is discharged at a velocity sufficient to heat a substantial area adjacent and surrounding the furnace. The size of each of the four outlets 56 may be regulated by adjustable plates 62 slidably arranged in guides 64 secured to the casing 10. If it is desired to heat a larger area or to distribute the heated air for a greater distance over the floor, the plates 62 may be lowered so as to decrease the size of the outlets 56 and thereby increase the velocity of the heated air.

The filter box 44 comprises a sheet metal casing or conduit 66 secured to the exterior of the furnace casing 10 and communicating at its lower end with the outlet 42 from the heat exchanger. An opening 68 is provided at the upper end of the conduit 66 above the top wall of the casing 10. The conduit 66 also has an opening 70 at its upper end. A damper or closure member 72 is pivotally mounted on the upper end of the conduit 66 at 74 and is adapted to close either of the openings 68 or 70.

In the preferred arrangement the damper 72 is arranged to close the opening 70 in the conduit 66 thereby permitting the products of combustion flowing through the conduit to be discharged through the opening 68 adjacent the blower inlet 50. The products of combustion discharged through the opening 68 will be drawn into the blower through the inlet 50 and mixed with the air to be heated and discharged into the furnace with such air and through the outlets 56 into the space to be heated.

A filter 76 is arranged in the conduit 66 above the outlet 42 from the heat exchanger and is adapted to remove objectionable impurities from the products of combustion which are passed therethrough. The filter may be a mechanical type filter or it may be a suitable chemical type filter adapted to treat the products of combustion so as to remove the sulphur dioxide gases therefrom or any other impurities. The particular type filter employed can best be determined from the nature of the flue gases generated by the fuel burner. Generally speaking, when a good grade of fuel oil is used the only objectionable gases which it might be desirable to remove would be sulphur dioxide. If kerosene is employed no filter need be employed as the kerosene generally available contains no sulphur. In any event, the filter 76 would be of a type suitable for the objectionable impurities in the particular flue gases generated.

The blower 18 will draw the heated flue gases through the inlet 50 and mix the same with the air to be heated which is also drawn into the blower through the inlets 58. The proportion of the volume of the flue gases drawn into the blower to the volume of the surrounding air drawn into the blower is relatively small and will generally be in the neighborhood of one-eighth of the total volume of air discharged by the blower. This proportion will naturally depend upon the capacity of the blower and the rate at which fuel is burned and the amount of combustion air delivered by the fan 24 of the burner 16. The flue gases at their discharge will be heated to a temperature of approximately 400° to 600° F. These hot flue gases are mixed with the relatively cold air surrounding the blower 18 so as to increase the temperature of the mixture of air and flue gases discharged by the blower into the furnace considerably above the temperature at which such air to be heated would normally be discharged without being mixed with the heated flue gases. As a result thereof, 100% of the potential heat available from the combustion of the fuel oil is employed in heating the air which is to be discharged into the space to be heated. The efficiency of the furnace is therefore increased by as much as one-third. It has been found that the arrangement just described will increase the temperature at which air is discharged through the outlets 56 an appreciable amount, the temperature of such discharged air being considerably greater than would be possible if the flue gases were discharged to the atmosphere as is usually done.

In Fig. 5 there is disclosed an arrangement whereby the flue gases may be vented to the atmosphere if desired. The upper end of the conduit 66 is formed so that a flue 80 may be secured thereto communicating with the interior of the conduit 66 through the opening 70. If for any reason it is desired to vent the products of combustion to the atmosphere, the damper 72 is moved into the position shown in Fig. 5, in which position the outlet 68 is closed and the outlet 70 is open permitting flow of the products of combustion through the flue 80.

The filter 76 and the conduit 66 may be constructed so that the filter is removable from the conduit whereby a new filter may be arranged therein when desired.

Suitable controls, such as a fan and limit switch 82 and a control 84 are secured to the casing and are operable for controlling the operation of the burner 16 and the fan 24.

The heat exchanger construction illustrated has been found to be particularly efficient because of the great amount of heated surface exposed to the circulating air for the overall size of the furnace. A furnace embodying the construction illustrated having an overall height of 6 ft. 8 in. and with outside dimensions for the casing of 22 in. x 22 in. and using a blower with an output of 1000 cu. ft. per minute will produce a heat output of approximately 130,000 B. t. u. per hour without recirculating the flue gases, and with recirculation of the flue gases will produce a heat output of approximately 160,000 B. t. u. per hour. The overall weight of such furnace, including the blower and oil burner, is approximately 250 pounds.

Because of the high heat output and the relatively light weight of the furnace, it can be employed for heating applications of all kinds, both temporary and permanent—the only requirements being a source of current for operating the oil burner and blower and, of course, a supply of oil for the oil burner.

Because the heated air is delivered laterally outwardly from the bottom of the furnace at a relatively high temperature, at least 130° to 165° F. above the temperature of the air at the blower inlet, and more if the recirculation arrangement is used, the area traversed by the heated air streams delivered from the furnace outlets 56 and the space immediately above such area will be heated sufficiently to permit people to occupy and work in such area under satisfactory temperature conditions—even outside at below zero temperatures if a wind screen is employed to shield the area of activity from wind.

The heat exchanger construction causes the products of combustion to contact and heat all of the surface thereof before escaping through the outlet 42. A consequence of circulating the flue gases with the air circulated by the blower 48 is that the water vapor produced by the combustion of the oil serves to humidify the heated air.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. Heating apparatus comprising an outer casing, a vertically disposed sheet metal drum defining a heat exchanger in said casing and spaced from the top and side walls thereof, oil burning means at the lower end of said drum and including a fan for supplying combustion air to said drum and for effecting the passage of the heated products of combustion of said oil burning means upwardly through said heat exchanger, an outlet for said products of combustion adjacent the upper end of said heat exchanger, a blower having an inlet located outside said casing for air to be heated and an outlet therefrom communicating with the interior of said casing at the upper end thereof for discharging air to be heated into said casing and downwardly over said heat exchanger in counterflow heat exchange relation with the products of combustion therein, said casing having an outlet at the lower end thereof for discharging heated air directly into a space to be heated, said heat exchanger outlet being adapted to conduct the products of combustion to the outside of said casing to a point adjacent said blower inlet whereby said products of combustion are discharged from said heat exchanger so as to be drawn into said blower and discharged therefrom with air to be heated over said heat exchanger and into said space to be heated.

2. Heating apparatus comprising an outer casing, a heat exchanger in said casing and spaced from the walls thereof so as to define an annular path between said casing and heat exchanger for air to be heated, oil burning means at the lower end of said heat exchanger, a fan associated with said oil burning means for supplying combustion air thereto and for effecting the passage of the heated products of combustion of said oil burning means through said heat exchanger, a blower having an inlet for air to be heated and an outlet therefrom communicating with the interior of said casing for circulating air to be heated through said annular path over said heat exchanger in heat exchange relation therewith, said casing having an outlet therefrom for discharging heated air into a space to be heated, and means for utilizing the heat of the products of combustion after discharge from said heat exchanger for heating the space to be heated comprising a heat exchanger outlet arranged to discharge said products of combustion into the air circulated by said blower whereby said products of combustion are mixed with such air and discharged therewith into said space to be heated.

3. Heating apparatus comprising an outer casing, a vertically disposed heat exchanger in said casing and spaced from the top and side walls thereof, oil burning means at the lower end of said heat exchanger and including a fan associated therewith for supplying combustion air to said oil burning means and for effecting the passage of the heated products of combustion of said oil burning means upwardly through said heat exchanger, an outlet for said products of combustion adjacent the upper end of said heat exchanger, conduit means communicating with said heat exchanger outlet for discharging said products of combustion to atmosphere, a blower having an inlet for air to be heated and an outlet therefrom communicating with the interior of said casing at the upper end thereof for discharging air to be heated into said casing and downwardly over said heat exchanger in counterflow heat exchange relation with the products of combustion therein, said casing having an outlet at the lower end thereof for discharging heated air into a space to be heated, said conduit means having an outlet therefrom positioned adjacent said blower inlet, and by-pass means associated with said conduit means for by-passing said atmospheric discharge for said products of combustion, said by-pass means being constructed and arranged to selectively deliver said products of combustion to said atmospheric discharge, or to said outlet therefrom adjacent said blower inlet whereby said products of combustion are drawn into said blower and discharged therefrom with air to be heated over said heat exchanger and into said space to be heated so as to be utilized in heating said space.

4. Heating apparatus comprising a casing, a heat exchanger in said casing and defining therewith a path through said casing for air to be heated, fuel burning means for generating products of combustion in said heat exchanger, a blower having an inlet for air to be heated and an outlet communicating with the interior of said casing for circulating air to be heated through said path in heat exchange relation with said heat exchanger, said casing having an outlet therefrom for delivering heated air into a space to be heated, said heat exchanger having an outlet for products of combustion, conduit means communicating with said heat exchanger outlet and having an outlet adapted to discharge the products of combustion to atmosphere and an outlet positioned adjacent said blower inlet for discharging products of combustion into said blower for discharge therefrom with air to be heated into said casing, and means associated with said conduit for selectively discharging products of combustion through either of said conduit outlets.

References Cited in the file of this patent

UNITED STATES PATENTS

| Number | Name | Date |
|---|---|---|
| 1,301,324 | Schlatter | Apr. 22, 1919 |
| 1,965,090 | Werner | July 3, 1934 |
| 2,017,621 | Grazier | Oct. 15, 1935 |
| 2,139,760 | Losche | Dec. 13, 1938 |
| 2,312,123 | Place | Feb. 23, 1943 |
| 2,418,097 | Ruff | Mar. 25, 1947 |
| 2,462,395 | Heiman | Feb. 22, 1949 |
| 2,478,069 | Walter | Aug. 2, 1949 |
| 2,517,398 | McCollum | Aug. 1, 1950 |
| 2,600,603 | Applegate | June 17, 1952 |
| 2,604,312 | Anderson et al. | July 22, 1952 |

FOREIGN PATENTS

| Number | Country | Date |
|---|---|---|
| 446,430 | Great Britain | Apr. 30, 1936 |